(12) United States Patent
Wang (10) Patent No.: US 11,279,212 B2
(45) Date of Patent: Mar. 22, 2022

(54) TRUCK BED COVER (71) Applicant: Jia Hui Wang, Wenzhou (CN)

(72) Inventor: Jia Hui Wang, Wenzhou (CN)

( * ) Notice: Subject to any disclaimer, the term of this patent is extended or adjusted under 35 U.S.C. 154(b) by 47 days.

(21) Appl. No.: 16/747,826

(22) Filed: Jan. 21, 2020

(65) Prior Publication Data
US 2021/0221204 A1 Jul. 22, 2021

(51) Int. Cl.
*B60J 7/14* (2006.01)
*B60J 7/16* (2006.01)
*B60P 7/02* (2006.01)

(52) U.S. Cl.
CPC ............ *B60J 7/141* (2013.01); *B60J 7/1607* (2013.01); *B60P 7/02* (2013.01)

(58) Field of Classification Search
CPC ........ B60J 7/141; B60J 7/1607; B60J 7/1621; B60P 7/04; B60P 7/02
USPC .......... 296/100.01, 100.002, 100.06, 100.07, 296/100.09
See application file for complete search history.

(56) References Cited

U.S. PATENT DOCUMENTS

| | | |
|---|---|---|
| 5,636,893 A | 6/1997 | Wheatley et al. |
| 5,752,791 A | 5/1998 | Ehrlich |
| 5,906,407 A | 5/1999 | Schmeichel |
| 5,934,849 A | 8/1999 | Haire |
| D434,361 S | 11/2000 | Block et al. |
| 6,857,683 B2 | 2/2005 | Myers |
| 7,188,888 B2 | 3/2007 | Wheatley et al. |
| 7,484,788 B2 | 2/2009 | Calder et al. |
| D620,877 S | 8/2010 | Rusher et al. |
| 8,061,758 B2 | 11/2011 | Maimin et al. |
| 8,182,021 B2 | 5/2012 | Maimin et al. |
| 8,672,388 B2 | 3/2014 | Rusher et al. |
| 8,690,224 B2 | 4/2014 | Maimin et al. |
| 9,399,391 B2 | 7/2016 | Bernardo et al. |
| 9,827,839 B2* | 11/2017 | Williamson ............. B60J 7/198 |
| 10,046,632 B2* | 8/2018 | Dylewski, II ............. B60P 7/02 |
| 10,189,340 B2 | 1/2019 | Schmeichel et al. |
| 2016/0031305 A1* | 2/2016 | Bernardo ................. B60J 7/041 |
| | | 296/100.03 |
| 2019/0100088 A1* | 4/2019 | Facchinello ............. B60J 10/00 |
| 2019/0126734 A1* | 5/2019 | Dylewski, II ............. B60J 7/141 |

* cited by examiner

*Primary Examiner* — Jason S Daniels
(74) *Attorney, Agent, or Firm* — Averill & Green; Kenneth L. Green (57) ABSTRACT

A pickup truck bed cover includes foldable horizontal sections retained on a mounting frame by left and right latches attached under the sections. The latches mounting plates, left and right locks, and left and right operating mechanisms. The operating mechanisms are connected to the locks to pull the locks into disengagement with the mounting frame allowing the sections to be folded. Connecting members connect the operating mechanisms. When a handle of one of the operating mechanism is being twisted, both the left and right locking blocks are simultaneously retract to disengage with the mounting frame. When the handle is released, the left and right locks extend to engage the mounting frame. The rotation of the handles may be coupled to the locks by sliding cylinders having spiral surfaces engaged by inside protrusions in the handles. Springs inside the handles bias the sliding cylinders apart to engage the locks.

16 Claims, 8 Drawing Sheets

TRUCK BED COVER

BACKGROUND OF THE INVENTION

The present invention relates to truck bed covers and in particular to latching apparatus for the truck bed cover.

The latching devices of the existing truck bed covers have a complicated structure which requires an inefficient procedure to operate; they often requires users to operate the latches twice in order to open the truck bed cover. In addition, a mounting frame needs to be pre-installed on the two side panels of the truck bed, and since the models of the trucks are different every year, variations in the separation of the two side panels must be compensated for to some extent, resulting in the inaccuracy of the installation dimension between the truck bed cover and a mounting frame.

Moreover, some of the side panels of the existing truck beds would be tilted at a certain angle, while some are vertical. Since the standard is not uniform, the installation of the mounting frame might not meet the requirement, causing the cover to be installed loosely.

BRIEF SUMMARY OF THE INVENTION

The present invention addresses the above and other needs by providing a pickup truck bed cover including foldable horizontal sections retained on a mounting frame by left and right latches attached under the sections. The latches mounting plates, left and right locks, and left and right operating mechanisms. The operating mechanisms are connected to the locks to pull the locks into disengagement with the mounting frame allowing the sections to be folded. Connecting members connect the operating mechanisms. When a handle of one of the operating mechanism is being twisted, both the left and right locking blocks are simultaneously retract to disengage with the mounting frame. When the handle is released, the left and right locks extend to engage the mounting frame. The rotation of the handles may be coupled to the locks by sliding cylinders having spiral surfaces engaged by inside protrusions in the handles.

In accordance with one aspect of the invention, there is provided a operating mechanism including sliding cylinders inside rotatable handles. The exterior of the sliding cylinders include spiral surfaces, and the handles include interior protrusions engaging the spiral surfaces. The cylinders can slide laterally but include

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figures 1A, 1B, 2:
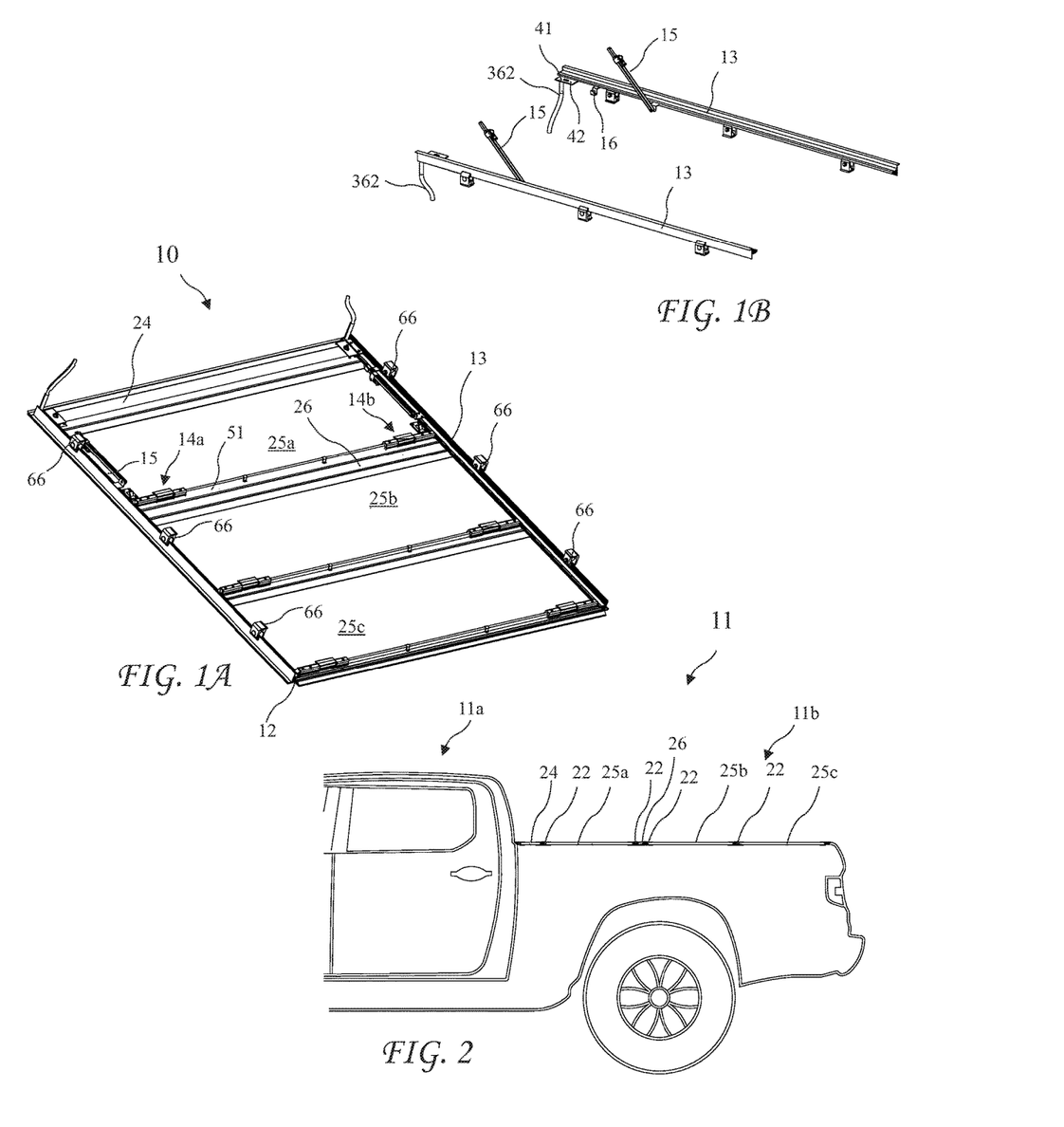
FIG. 1A shows a bottom quarter view a truck bed cover according to the present invention.
FIG. 1B shows a top view of a mounting frame of the truck bed cover according to the present invention.
FIG. 2 shows a side view of the truck bed cover according to the present invention installed on a truck.
Figure 7:
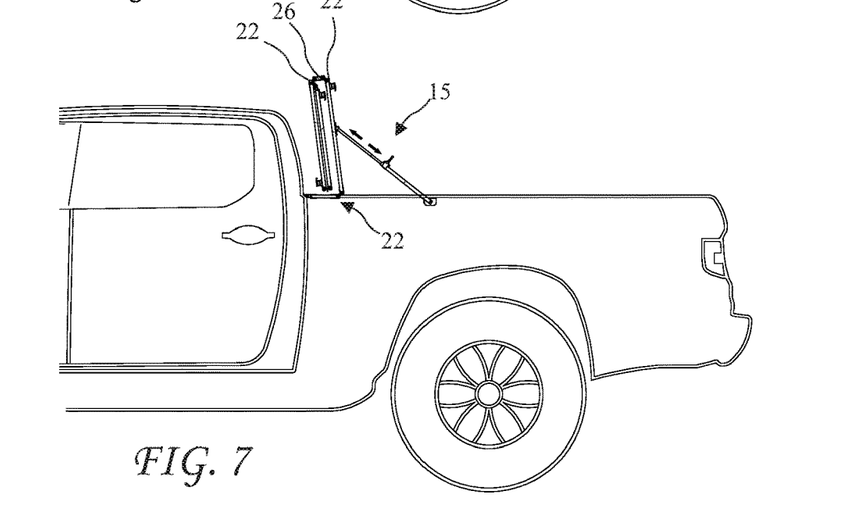
FIG. 7 shows the truck bed cover installed on a truck with all three sections folded open and against the cab and supported by a support according to the present invention.

A bottom quarter view a truck bed cover 10 according to the present invention is shown in FIG. 1A, a top view of a mounting frame 13 and adjustable supports 15 is shown in FIG. 1B, and a side view of the truck bed cover 10 installed on a truck bed 11b behind a truck cab 11a is shown in FIG. 2. The truck bed cover 10 includes a stationary front cover plate 24, folding sections 25a, 25b, and 25c, flexible edge coverings 12 on the left and right sides of the mounting frame 13, and latch mechanisms 14a and 14b which engage the mounting frame 13 to hold the sections 25a, 25b, and 25c against the truck bed 11b. A spacer plate 26 resides between the first and second sections 25a and 25b to facilitate folding the sections 25a, 25b, and 25c as shown in FIG. 7.

The left and right latch mechanisms 14a and 14b are attached to opposite sides of mounting plates 51 (also see FIG. 14) on the bottom of the truck bed cover 10. Adjustable supports 15 are attached to the mounting frame 13 to support the sections 25a, 25b, and 25c when folded forward towards the cab 11a. A storage hook 16 is attached to the mounting frame 13 to retain the adjustable supports 15 when not in use, as shown FIG. 17. The mounting frame 13 includes drain tubes 362 (also see FIG. 14).

Figure 3A:
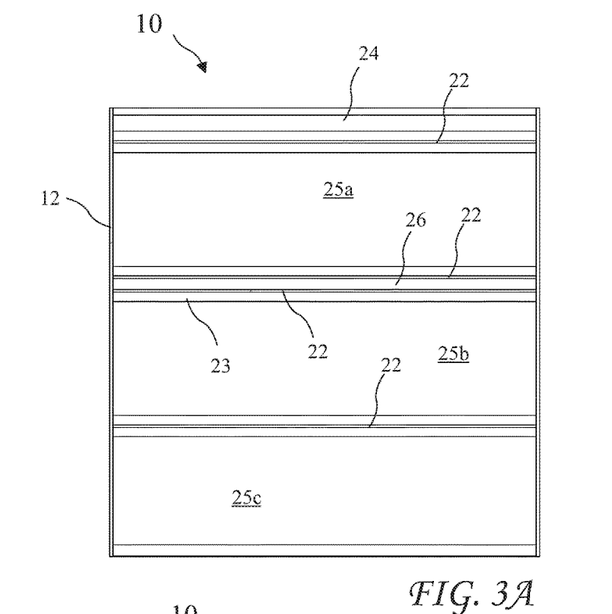
FIG. 3A shows a top plan view of the truck bed cover according to the present invention.
Figure 3B:
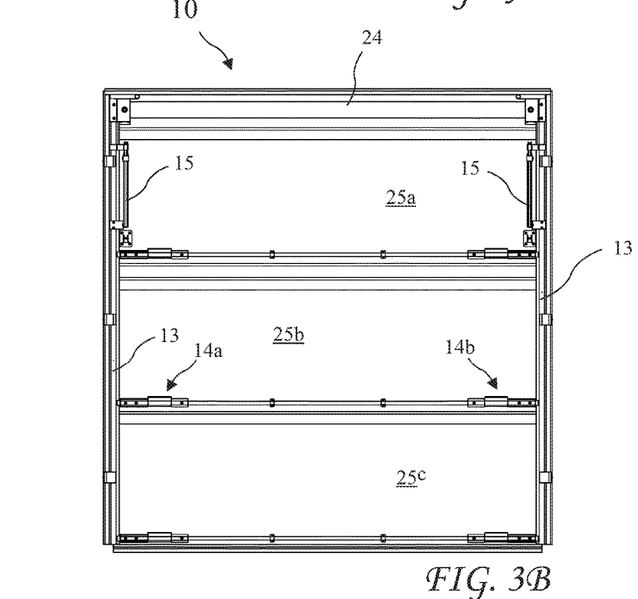
FIG. 3B shows a bottom plan view of the truck bed cover according to the present invention.

A top plan view of the truck bed cover 10 is shown in FIG. 3a and a bottom plan view of the truck bed cover 10 is shown in FIG. 3B.

Figure 4:
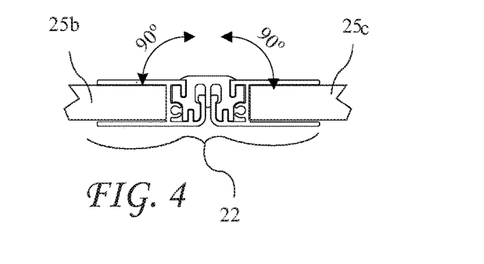
FIG. 4 shows a flexible connection between sections of the truck bed cover according to the present invention.
Figure 4A:
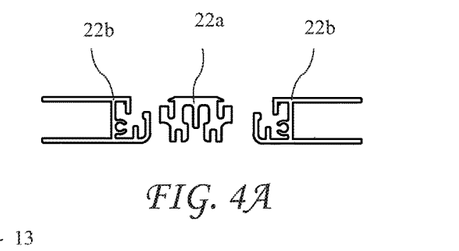
FIG. 4A shows an exploded view of the flexible connection according to the present invention.

A flexible coupling 22 connecting consecutive sections 25 of the truck bed cover 10 is shown in FIG. 4 and an exploded view of the flexible coupling 22 is shown in FIG. 4A. The flexible coupling 22 includes a flexible center portion 22a and sides 22b engaging the sections 25a, 25b, and 25c, the front cover plate 24, and the spacer plate 26, and allows each section 25a, 25b, and 25c to pivot up to 90 degree for folding the truck bed cover 10.

Figure 5:
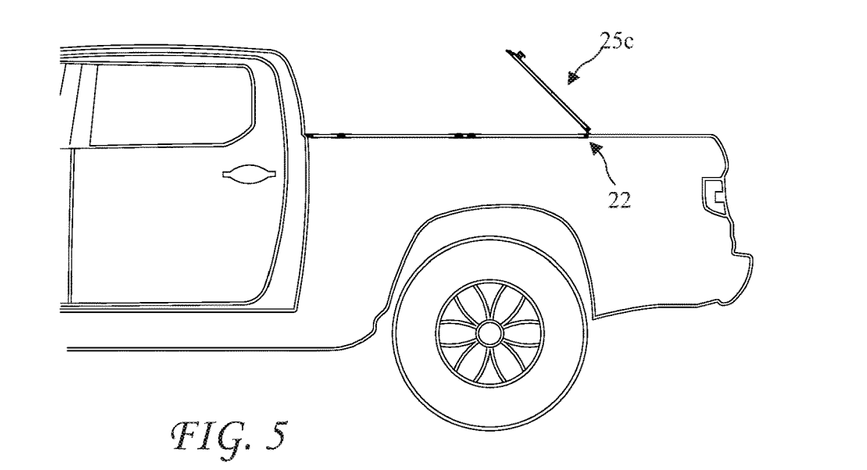
FIG. 5 shows a side view of the truck bed cover according to the present invention installed on a truck with a rear most section folded opened.
Figure 6:
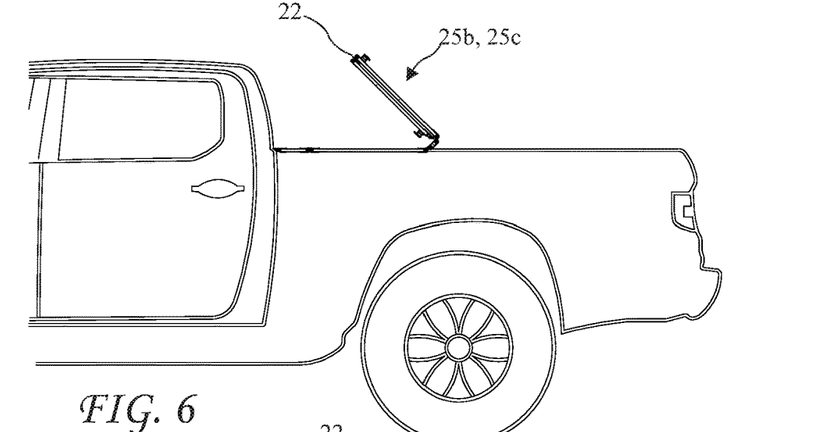
FIG. 6 shows a view of the truck bed cover according to the present invention installed on a truck with two rear most sections folded open.
Figure 8:
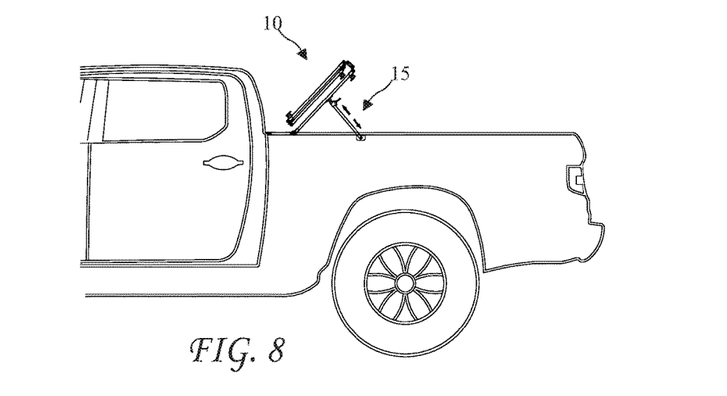
FIG. 8 shows the truck bed cover installed on a truck with all three sections folded partially open and leaned away from the cab and supported by the support according to the present invention.

A side view of the truck bed cover 10 installed on a truck with a rear most section 25c folded opened is shown in FIG. 5, a view of the truck bed cover 10 with two rear most sections 25b and 26c folded open is shown in FIG. 6, the truck bed cover 10 with all three sections 25a, 25b, and 25c folded open and against the cab 11a and supported by the support 15 is shown in FIG. 7, and the truck bed cover 10 with all three sections 25a, 25b, and 25c folded partially open and leaned away from the cab and supported by the support 15 is shown in FIG. 8. The support 15 has adjustable length to adjust the tilt of the folded sections 25a, 25b, and 25c.

Figure 9:
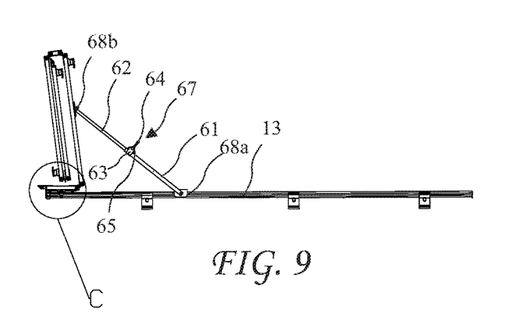
FIG. 9 shows a more detailed view of the folded sections and the support according to the present invention.
Figure 10:
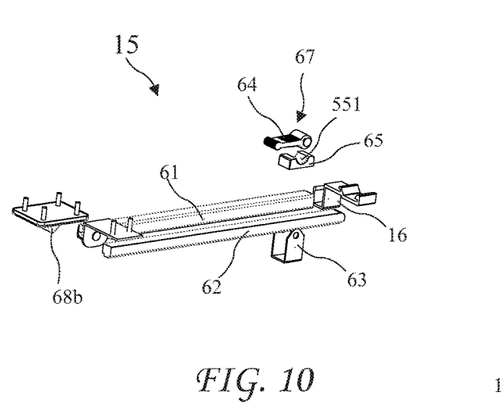
FIG. 10 shows an exploded view the support of the truck bed cover according to the present invention.
Figure 11:
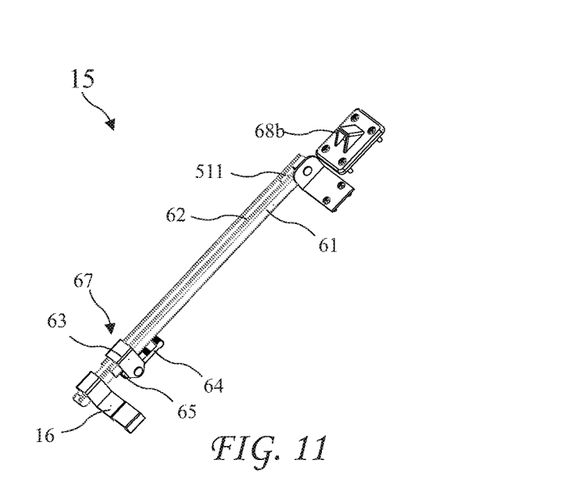
FIG. 11 shows a bottom view of the support according to the present invention.

A detailed view of the folded sections 25a, 25b, and 25c and the support 15 is shown in FIG. 9, an exploded view of the support 15 is shown in FIG. 10, and a bottom view of the support 15 is shown in FIG. 11. The support 15 includes a fixed portion 61, a sliding portion 62 and a support latch 67 fixed to the fixed portion 61 to fix the engagement of the sliding portion 62 in the fixed portion 61 by rotation of an eccentric lever 64 pressing a block 65 towards a U-shaped bracket 63 to grasp the sliding portion 62. The support 15 is pivotally attached to the mounting frame 13 by first pivot 68a and pivotally attached to the first section 25a by second pivot 68b.

Figure 12:
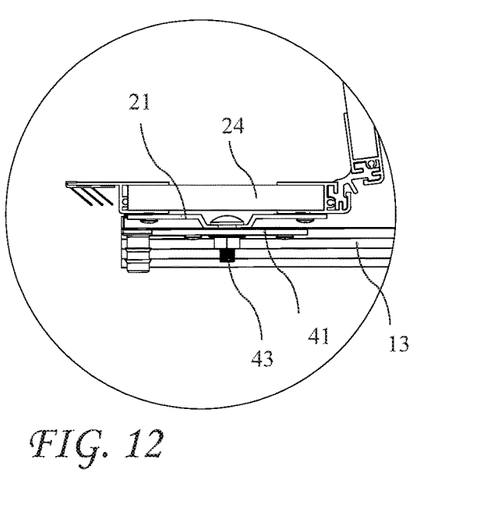
FIG. 12 shows a view of portion C of FIG. 9 showing attachment of a stationary front cover plate according to the present invention.
Figure 13:
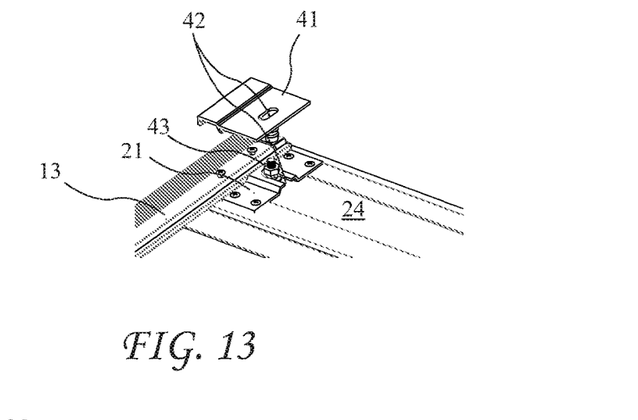
FIG. 13 shows an exploded view of the attachment of a stationary front cover plate according to the present invention.

A detailed view of portion C of FIG. 9 showing attachment of the front cover plate 24 is shown in FIG. 12 and an exploded view of the attachment of a stationary front cover plate 24 is shown in FIG. 13. A mounting plate 21 is fixed to the bottom of the front cover plate 24, and a mounting plate 41 is connected to the mounting plate 21 by faster 43 and sandwiches the mounting frame 13 between the mounting plate 41 and the cover plate 24 to attach the cover plate 24 to the mounting frame 13.

Figure 14:
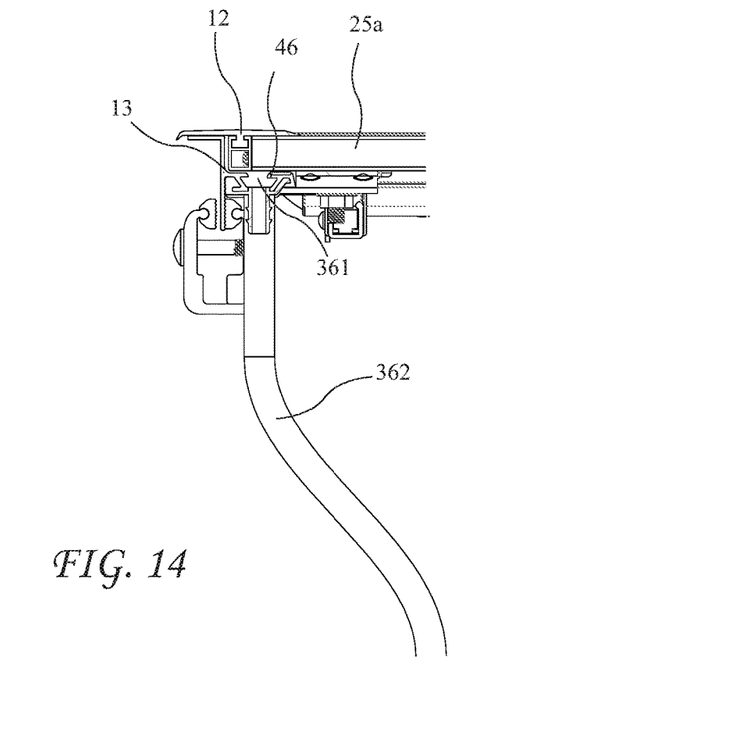
FIG. 14 shows a drain structure of the truck bed cover according to the present invention.

A drain structure of the truck bed cover 10 is shown in FIG. 14. The first section 25a a rests on a support strip 46 of the mounting frame 13. A drain 361 under the first section 25a provides path for moisture to flow to the drain tube 362. The flexible edge coverings 12 is attached to the edge of the first section 25a overlapping the mounting frame 13.

Figure 15:
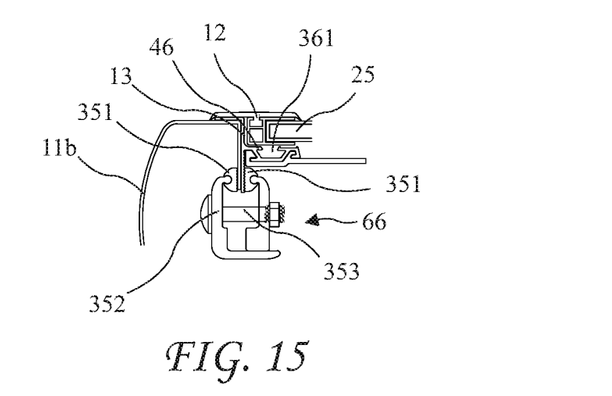
FIG. 15 shows a frame clamp according to the present invention.
Figure 16:
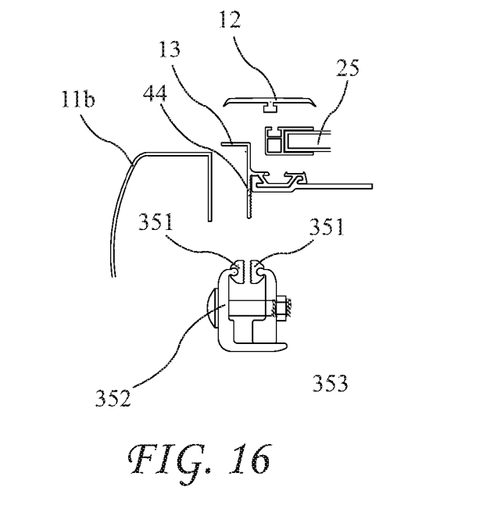
FIG. 16 shows an exploded view of the frame clamp according to the present invention.
Figure 17:
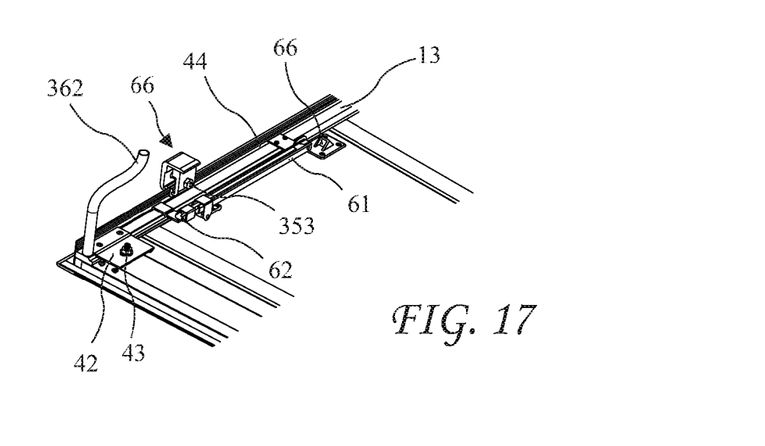
FIG. 17 shows the frame clamp and support according to the present invention.

A frame clamp 66 attaching the mounting frame 13 to the truck bed 11b is shown in FIG. 15, an exploded view of the frame clamp 66 is shown in FIG. 16, and the frame clamp 66 and support 15 are shown in FIG. 17. The frame clamp 66 includes lips 351 and jaws 352 sandwiching the mounting frame 13 to the truck bed 11b, the jaws 352 joined by fastener 353. The flexible edge coverings 12 overlaps the truck bed 11c providing sealing.

Figures 18, 19, 20:
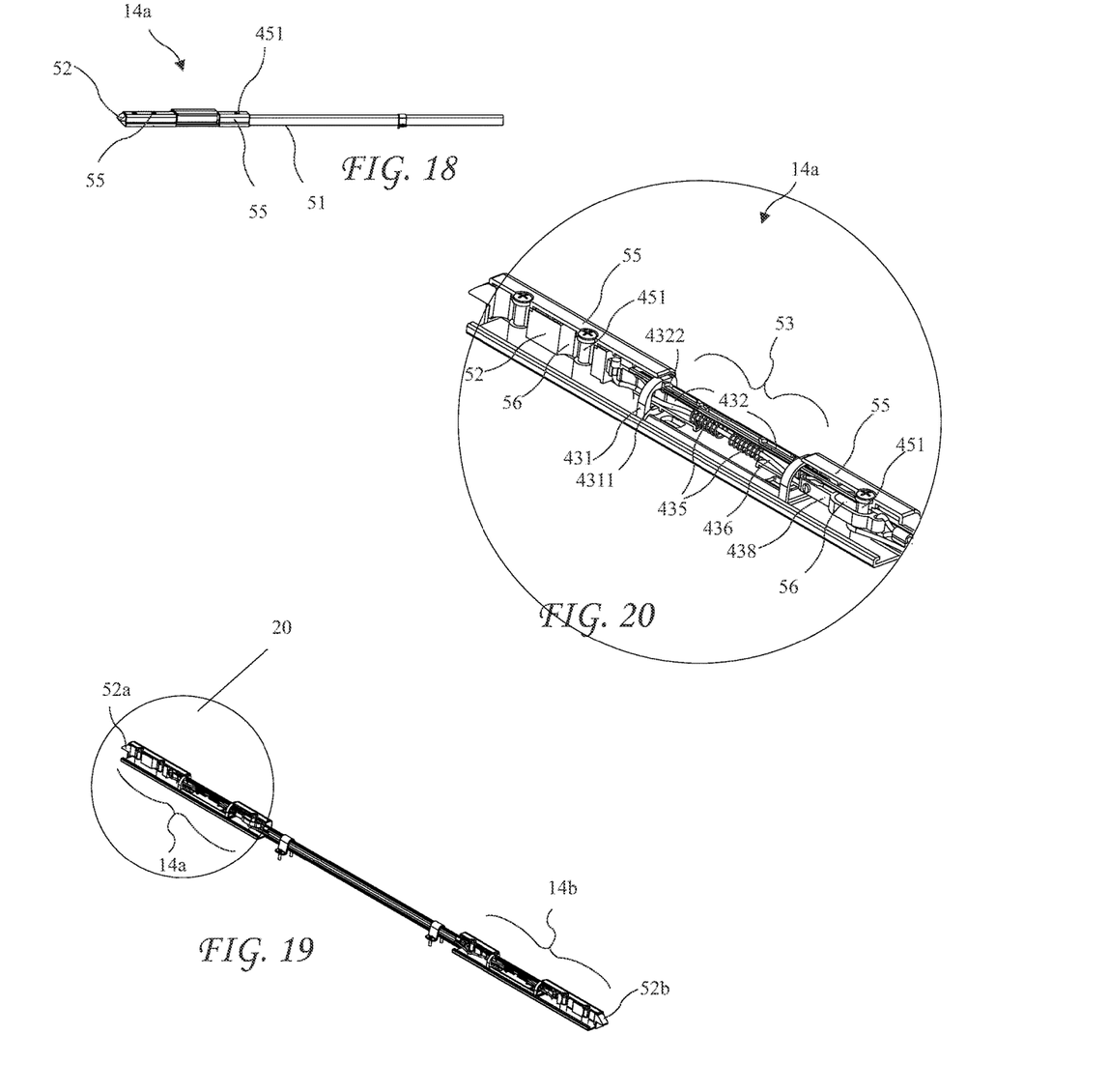
FIG. 18 shows one side of a latch mechanism according to the present invention.
FIG. 19 shows a cut-away view of the latch mechanism according to the present invention.
FIG. 20 shown a detailed cut-away view of the latch mechanism according to the present invention.
Figure 21:
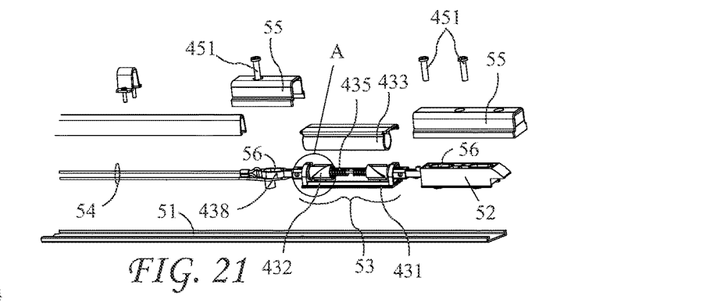
FIG. 21 shown an exploded of the latch mechanism according to the present invention.
Figure 22:
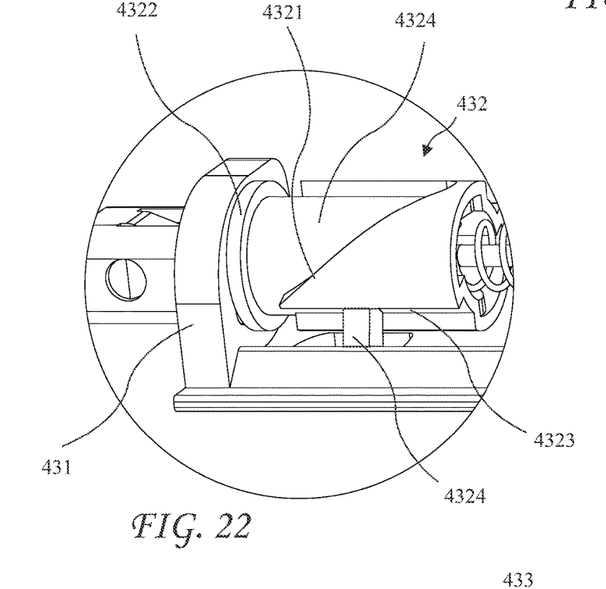
FIG. 22 shows details of a sliding cylinder according to the present invention.
Figure 23:
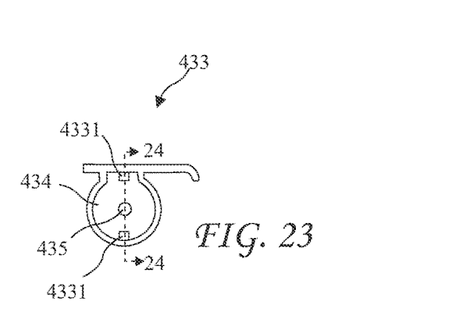
FIG. 23 shows an end view of and operating handle for the latch mechanism according to the present invention.
Figure 24:
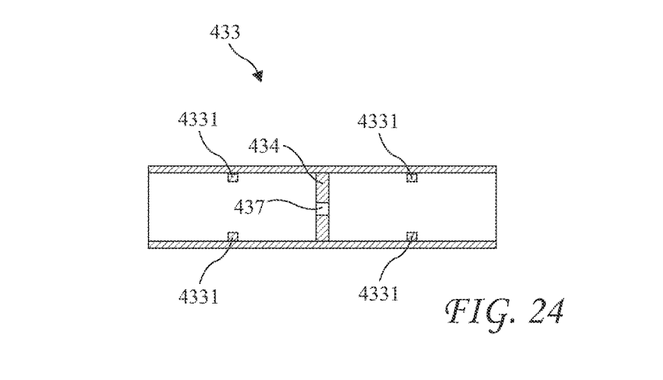
FIG. 24 shows a cross-sectional view of the operating handle taken along line 24-24 of FIG. 23.

The left latch mechanism 14a is shown in FIG. 18, a cut-away view of the latch mechanisms 14a and 14b is shown in FIG. 19, and a detailed cut-away view of the left latch mechanism 14a is shown in FIG. 20. An exploded of the latch mechanisms 14a and 14b is shown in FIG. 21, details of a sliding cylinder 432 are shown in FIG. 22, an end view of the operating handle 433 for the latch mechanisms 14a and 14b is shown in FIG. 23, and a cross-sectional view of the operating handle 433 taken along line 24-24 of FIG. 23 is shown in FIG. 24. The latch mechanisms 14a and 14b are attached to the mounting plates 51, and include operating mechanisms 53 with retracting locks 52 when handles 433 are rotated.

Springs 435 reside inside the handles 433 separated by wall 434 (see FIGS. 23 and 24) and press sliding cylinders 432 outward biasing locks 52 outward to latch the sections 25a, 25b, and 25c to the mounting frame 13 (see FIG. 1B). When the handles 433 are rotated, the protrusions 4332 inside the handles 433 press against spiral surfaces 4321 on the sliding cylinders 432 to press the sliding cylinders 432 together, disengaging the lock 52. The motion of the sliding cylinders 432 further pulls a connection 54 connected to the opposite latch mechanism 14b to draw the opposite lock 52 inward to simultaneously release the latch mechanisms 14a and 14b allowing a user to conveniently release the section 25a, 25b, or 25c with a single operation.

The sliding cylinders 432 include longitudinal, exterior, slots 4323 cooperating with guides 4324 fixed to the bases 431, preventing the sliding cylinders from rotating with the handles 433. A link 436 reaches through the springs 435 and the passage 437 in the wall 434 to connect the locks 52 to couplings 438 connecting the left and right operating mechanisms 53. The covers 55 are held by screws 451 passing through slots 56 in the locks 52 and the couplings 438 to allow the locks 52 and couplings 438 to move laterally unlocking and locking the latch mechanisms 14a and 14b.

While the invention herein disclosed has been described by means of specific embodiments and applications thereof, numerous modifications and variations could be made thereto by those skilled in the art without departing from the scope of the invention set forth in the claims.

I claim:
1. A truck bed cover, comprising:
a mounting frame attachable to a truck bed;
foldable sections;
elastic members connecting the sections; and
pairs of left and right operating mechanisms attached to the truck bed cover proximal to left and right sides of the truck bed cover;
the operating mechanisms including locks engaging the mounting frame to retain the sections against the mounting frame;

at least one of the pair of the operating mechanism including a handle to retract the locks to disengage from the mounting frame; and the operating mechanisms connected to couple the retraction of one of the locks in each pair of the operating mechanism with an opposite one of the locks in the same pair of the operating mechanism, wherein:

a left and a right coupling residing at interior ends of each of the operating mechanisms;

a connector connects the left and right couplings of each pair of operating mechanisms;

the locks are connected to the couplings;

actuation of the handle draws the coupling and the lock together in the actuated on of the operating mechanisms disengaging the lock of the actuated one of the operating mechanisms from the mounting frame, and draws the connector towards the left actuated one of the operating mechanisms drawing the opposite lock inward, disengaging the opposite lock from the mounting frame;

each actuated operating mechanism includes an inner sliding cylinder and an outer sliding cylinder;

a link reaching through the sliding cylinders;

the inner sliding cylinder is connected to the connector and the outer sliding cylinder is connected to the lock;

the sliding cylinders include spiral surfaces;

the handles resides over the sliding cylinders and include protrusions engaging the spiral surfaces; and operation of the handles draws the sliding cylinders together shortening the link and disengaging the locks.

2. The truck bed cover of claim 1 wherein springs bias the horizontally sliding cylinders apart to engage the locks with the mounting frame.

3. The truck bed cover of claim 1 wherein both pairs of the operating mechanisms include handles to retract both of the locks.

4. A truck bed cover, comprising:

a mounting frame attachable to a truck bed;

foldable sections;

elastic members connecting the sections;

pairs of latch mechanisms attached proximal to left and right ends of each elastic member, the latch mechanisms engaging the mounting frame to retain the sections against the mounting frame and connected to couple the release of one of the latch mechanisms in each pair with an opposite one of the latch mechanisms in the same pair each pair of latch mechanisms includes left and right operating mechanisms;

a connection between the left and right operating mechanisms mechanically couples the left and right operating mechanisms;

the left operating mechanism is connected to a left horizontally sliding lock;

the right operating mechanism is connected to a right horizontally sliding lock;

the connection couples left actuation of the left operating mechanism to disengage the left horizontally sliding lock from the mounting frame with actuation of the right operating mechanism to disengage the right horizontally sliding lock from the mounting frame;

the connection couples right actuation of the left operating mechanism to disengage the right horizontally sliding lock from the mounting frame with actuation of the left operating mechanism to disengage the left horizontally sliding lock from the mounting frame;

the connection is attached to a left and a right coupling residing at interior ends of each latch mechanism;

the horizontally sliding locks are connected to the couplings by left and right links reaching through left and right latch mechanism respectively;

the left actuation of the left operating mechanisms includes urging left horizontally sliding elements together to disengage the left horizontally sliding lock from the mounting frame and to draw the connection towards the left operating mechanism disengaging the right horizontally sliding lock from the mounting frame; and the right actuation of the right operating mechanisms includes urging right horizontally sliding elements together to disengage the right horizontally sliding lock from the mounting frame and to draw the connection towards the right operating mechanism disengaging the left horizontally sliding lock from the mounting frame.

5. A truck bed cover, comprising:

a mounting frame attachable to a truck bed;

foldable sections;

elastic members connecting the sections;

pairs of latch mechanisms attached proximal to left and right ends of each elastic member, the latch mechanisms engaging the mounting frame to retain the sections against the mounting frame and connected to couple the release of one of the latch mechanisms in each pair with an opposite one of the latch mechanisms in the same pair each pair of latch mechanisms includes left and right operating mechanisms;

a connection between the left and right operating mechanisms mechanically couples the left and right operating mechanisms;

the left operating mechanism is connected to a left horizontally sliding lock;

the right operating mechanism is connected to a right horizontally sliding lock;

the connection couples left actuation of the left operating mechanism to disengage the left horizontally sliding lock from the mounting frame with actuation of the right operating mechanism to disengage the right horizontally sliding lock from the mounting frame;

the connection couples right actuation of the left operating mechanism to disengage the right horizontally sliding lock from the mounting frame with actuation of the left operating mechanism to disengage the left horizontally sliding lock from the mounting frame;

the connection is attached to a left and a right coupling residing at interior ends of each latch mechanism;

the horizontally sliding locks include diagonal surfaces and are connected to the couplings by left and right links reaching through left and right latch mechanism respectively;

the left actuation of the left operating mechanisms includes urging left horizontally sliding cylindrical elements including spiral surfaces together to disengage the left horizontally sliding lock from the mounting frame and to draw the connection towards the left operating mechanism disengaging the right horizontally sliding lock from the mounting frame; and the right actuation of the right operating mechanisms includes urging right horizontally sliding cylindrical elements including the spiral surfaces together to disengage the right horizontally sliding lock from the mounting frame and to draw the connection towards the right operating mechanism disengaging the left horizontally sliding lock from the mounting frame;

operating handles resides over the horizontally sliding elements and include protrusions engaging the diagonal surface of both horizontally sliding elements in each operating mechanism; and operation of the operating handles moves the horizontally sliding elements together; and springs bias the horizontally sliding cylindrical elements apart.

6. A truck bed cover, comprising:

a mounting frame attachable to a truck bed;

foldable sections;

elastic members connecting the sections; and pairs of left and right operating mechanisms attached to the truck bed cover proximal to left and right sides of the truck bed cover;

the operating mechanisms including locks engaging the mounting frame to retain the sections against the mounting frame;

at least one of the pair of the operating mechanism including a handle to retract the locks to disengage from the mounting frame; and the operating mechanisms connected to couple the retraction of one of the locks in each pair of the operating mechanism with an opposite one of the locks in the same pair of the operating mechanism, wherein:

at least one of each pair of the operating mechanism is an actuated operating mechanism including an inner sliding member and an outer sliding member;

the inner sliding member is connected by a connector to the lock of the opposite operating mechanism of each pair of operating mechanisms;

the outer sliding member is connected to the lock of the actuated operating mechanism;

operation of the handles draws the inner and outer sliding members together disengaging the locks;

the sliding members are sliding cylinders including spiral surfaces;

the handles resides over the sliding cylinders and include protrusions engaging the spiral surfaces; and operation of the handles draws the inner and outer sliding cylinders together disengaging the locks.

7. A truck bed cover, comprising:

a mounting frame attachable to a truck bed;

foldable sections;

elastic members connecting the sections; and pairs of left and right operating mechanisms attached to the truck bed cover proximal to left and right sides of the truck bed cover;

the operating mechanisms including locks engaging the mounting frame to retain the sections against the mounting frame;

at least one of the pair of the operating mechanism including a handle to retract the locks to disengage from the mounting frame; and the operating mechanisms connected to couple the retraction of one of the locks in each pair of the operating mechanism with an opposite one of the locks in the same pair of the operating mechanism, wherein:

both of each pair of the operating mechanisms include the handle to retract the locks;

the operating mechanism includes an inner sliding cylinder and an outer sliding cylinder;

links reach through the sliding cylinders;

the inner sliding cylinders are connected to the inner sliding cylinder of the opposite operating mechanism of each pair by a connector;

the outer sliding cylinders are connected to the locks;

the sliding cylinders include spiral surfaces;

the handles resides over both of the horizontally sliding cylinders and include protrusions engaging the spiral surfaces; and operation of the handles draws the inner sliding cylinder and the outer sliding cylinder together shortening the links and disengaging the locks.

8. A truck bed cover, comprising:

a mounting frame attachable to a truck bed;

foldable sections;

elastic members connecting the sections; and pairs of left and right operating mechanisms attached to the truck bed cover proximal to left and right sides of the truck bed cover;

the operating mechanisms including locks engaging the mounting frame to retain the sections against the mounting frame;

at least one of the pair of the operating mechanism including a handle to retract the locks to disengage from the mounting frame; and the operating mechanisms connected to couple the retraction of one of the locks in each pair of the operating mechanism with an opposite one of the locks in the same pair of the operating mechanism, wherein:

a left and a right coupling residing at interior ends of each of the operating mechanisms;

a connector connects the left and right couplings of each pair of operating mechanisms;

the locks are connected to the couplings; and actuation of the handle shortens a link between the coupling and the lock in the actuated one of the operating mechanisms disengaging the lock of the actuated one of the operating mechanisms from the mounting frame, and draws the connector towards the actuated one of the operating mechanisms drawing the opposite lock inward disengaging the opposite lock from the mounting frame.

9. A truck bed cover, comprising:

a mounting frame attachable to a truck bed;

foldable sections;

elastic members connecting the sections; and pairs of left and right operating mechanisms attached to the truck bed cover proximal to left and right sides of the truck bed cover;

the operating mechanisms including locks engaging the mounting frame to retain the sections against the mounting frame;

at least one of the pair of the operating mechanism including a handle to retract the locks to disengage from the mounting frame; and the operating mechanisms connected to couple the retraction of one of the locks in each pair of the operating mechanism with an opposite one of the locks in the same pair of the operating mechanism, wherein:

the pairs of locks are connected to a connector through links;

the links are extended to engage the locks with the mounting frame; and the handle is connected to each of the links to collapses the links to retract both of the locks to disengage the locks from the mounting frame.

10. A truck bed cover, comprising:

a mounting frame attachable to a truck bed;

foldable sections;
elastic members connecting the sections; and
pairs of left and right operating mechanisms attached to the truck bed cover proximal to left and right sides of the truck bed cover;
the operating mechanisms including locks engaging the mounting frame to retain the sections against the mounting frame;
at least one of the pair of the operating mechanism including a handle to retract the locks to disengage from the mounting frame; and
the operating mechanisms connected to couple the retraction of one of the locks in each pair of the operating mechanism with an opposite one of the locks in the same pair of the operating mechanism, wherein:
links connect the locks to couplings;
the couplings of each of the operating mechanisms are connected by a connector;
the links are normally biased apart to engage the locks with the mounting frame; and
the handle is connected to each of the links to collapses the links to retract both of the locks to disengage the locks from the mounting frame.

11. A truck bed cover, comprising:
a mounting frame attachable to a truck bed;
foldable sections;
elastic members connecting the sections; and
pairs of left and right operating mechanisms attached to the truck bed cover proximal to left and right sides of the truck bed cover;
the operating mechanisms including locks engaging the mounting frame to retain the sections against the mounting frame;
at least one of the pair of the operating mechanism including a handle to retract the locks to disengage from the mounting frame; and
the operating mechanisms connected to couple the retraction of one of the locks in each pair of the operating mechanism with an opposite one of the locks in the same pair of the operating mechanism, wherein:
links connect the locks to couplings;
the couplings of each of the operating mechanisms are connected by a connector;
the links are normally biased apart to engage the locks with the mounting frame; and
the handle cooperates with one of the links to collapses the one of the links to retract both of the locks to disengage the locks from the mounting frame.

12. A truck bed cover, comprising:
a mounting frame attachable to a truck bed;
foldable sections;
elastic members connecting the sections; and
pairs of left and right operating mechanisms attached to the truck bed cover proximal to left and right sides of the truck bed cover;
the operating mechanisms including locks engaging the mounting frame to retain the sections against the mounting frame;
at least one of the pair of the operating mechanism including a handle to retract the locks to disengage from the mounting frame; and
the operating mechanisms connected to couple the retraction of one of the locks in each pair of the operating mechanism with an opposite one of the locks in the same pair of the operating mechanism, wherein:
links connect the locks to couplings;
the couplings of each of the operating mechanisms are connected by a connector;
the links are normally biased apart to engage the locks with the mounting frame; and
the handle cooperates with one of the links to collapses both of the links to retract both of the locks to disengage the locks from the mounting frame.

13. A truck bed cover, comprising:
a mounting frame attachable to a truck bed;
foldable sections;
elastic members connecting the sections; and
pairs of left and right operating mechanisms attached to the truck bed cover proximal to left and right sides of the truck bed cover;
the operating mechanisms including locks engaging the mounting frame to retain the sections against the mounting frame;
at least one of the pair of the operating mechanism including a handle to retract the locks to disengage from the mounting frame; and
the operating mechanisms connected to couple the retraction of one of the locks in each pair of the operating mechanism with an opposite one of the locks in the same pair of the operating mechanism, wherein:
each operating mechanisms including links connected to and residing through sliding elements, the links and sliding elements moveable on fixed bases;
outer ones of the sliding elements connected to the locks;
inner ones of the sliding elements connected to a connector, the connector connecting the operating mechanisms;
the sliding elements are normally biased apart to engage the locks with the mounting frame; and
the handle cooperating with the sliding elements to draw the sliding elements together to collapse the links and to retract both of the locks to disengage the locks from the mounting frame.

14. A truck bed cover, comprising:
a mounting frame attachable to a truck bed;
foldable sections;
elastic members connecting the sections; and
pairs of left and right operating mechanisms attached to the truck bed cover proximal to left and right sides of the truck bed cover;
the operating mechanisms including locks engaging the mounting frame to retain the sections against the mounting frame;
at least one of the pair of the operating mechanism including a handle to retract the locks to disengage from the mounting frame; and
the operating mechanisms connected to couple the retraction of one of the locks in each pair of the operating mechanism with an opposite one of the locks in the same pair of the operating mechanism, wherein:
the pairs of left and right operating mechanisms are attached to the truck bed cover proximal to left and right ends of each elastic member;
at least one of each pair of the operating mechanism is an actuated operating mechanism including an inner sliding member and an outer sliding member;
the inner sliding member is connected by a connector to the lock of the opposite operating mechanism of each pair of operating mechanisms;
the outer sliding member is connected to the lock of the actuated operating mechanism; and
operation of the handles draws the inner and outer sliding members together disengaging the locks.

15. The truck bed cover of claim 14, wherein:
a left and a right coupling residing at interior ends of each of the operating mechanisms;
a connector connects the left and right couplings of each pair of operating mechanisms;
the locks are connected to the couplings; and
actuation of the handle draws the coupling and the lock together in the actuated one of the operating mechanisms disengaging the lock of the actuated one of the operating mechanisms from the mounting frame, and draws the connector towards the actuated one of the operating mechanisms drawing the opposite lock inward, disengaging the opposite lock from the mounting frame.

16. The truck bed cover of claim 14 wherein:
the sliding members are sliding cylinders including spiral surfaces;
the handles resides over the sliding cylinders and include protrusions engaging the spiral surfaces; and
operation of the handles draws the inner and outer sliding cylinders together disengaging the locks.

\* \* \* \* \*